United States Patent [19]

Kostiner

[11] Patent Number: 4,457,620
[45] Date of Patent: Jul. 3, 1984

[54] BORDER PRINTER FOR PHOTOGRAPHIC PRINTS

[76] Inventor: Edward Kostiner, 301 Murray St., Montreal, Quebec, Canada, H3C 2E1

[21] Appl. No.: 425,851

[22] Filed: Sep. 28, 1982

[30] Foreign Application Priority Data

Oct. 19, 1981 [GB] United Kingdom ............... 8131476

[51] Int. Cl.³ .................................................. G03B 27/58
[52] U.S. Cl. ........................................ 355/74; 355/54
[58] Field of Search ............................... 355/74, 54

[56] References Cited

U.S. PATENT DOCUMENTS

| | | | |
|---|---|---|---|
| 3,165,970 | 1/1965 | Pelletier | 355/74 |
| 4,154,526 | 5/1959 | Kostiner | 355/74 |
| 4,190,357 | 2/1980 | Kostiner | 355/74 |

*Primary Examiner*—Richard A. Wintercorn
*Attorney, Agent, or Firm*—Larson and Taylor

[57] ABSTRACT

An apparatus is disclosed for printing borders on photographic prints. Unlike the existing border printers, this apparatus permits opposite borders to be printed at the same time. The apparatus comprises a panel with a flat surface having a paper stop at one edge, a frame, hinged to the panel at the one edge, having two parallel arms perpendicular to the paper stop, two sliding cross bars extending between the two parallel arms, the cross bars adapted to be maintained parallel with the paper stop at any position in the frame, each cross bar having a straight edge strip at one side to press the photographic print against the flat surface of the panel, and an expandible lightproof concertina-type cover extending between the two sliding cross bars in the frame, the cover having lightproof edge connections with the two parallel arms when the cross bars are at any position in the frame.

6 Claims, 4 Drawing Figures

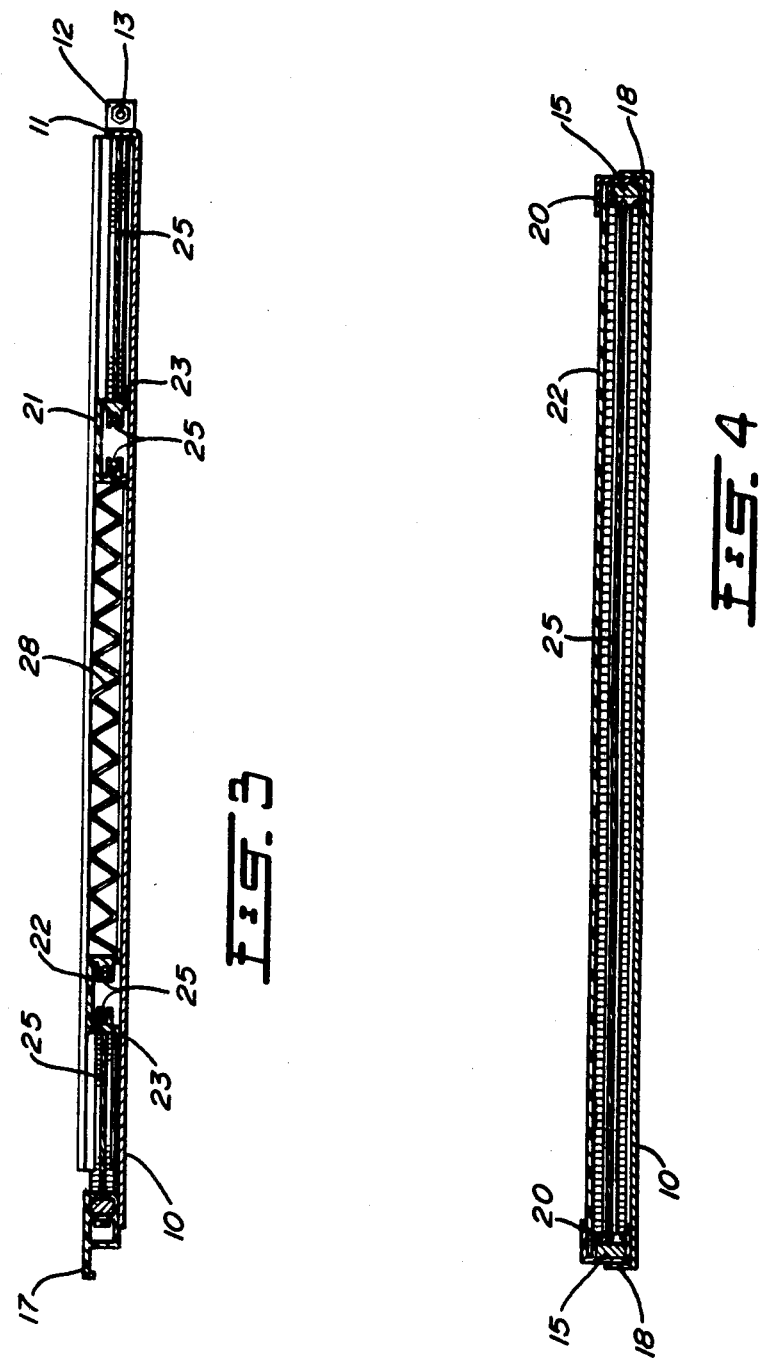

BORDER PRINTER FOR PHOTOGRAPHIC PRINTS

This invention relates to an apparatus for printing borders, particularly black borders on photographic prints.

In my U.S. Pat. No. 4,154,526, issued May 15, 1979, I disclose a black border printer which includes a light source within an enclosure having a translucent flat top surface to allow exposure of the edge or border of a print. I have found this apparatus works well, however, I have subsequently found that a more economical device may be made without an enclosure containing a light source. My new device still requires the border of the print to be exposed to light, but this can be achieved by a separate light source within a dark room.

In my previous device it was necessary to expose each side of the border separately before developing the print. In my new printer I have developed an apparatus which allows me to expose opposite sides of the border at the same time, thus reducing the number of steps necessary to print a border on a photographic print. The border printer may be used for printing a white border on reversal process colour paper, such as Cibachrome paper.

The border printer of the present invention has a top frame which is removable from the panel base, and may be mounted on the base plate of my photographic easel as shown in my U.S. Pat. No. 4,190,357 issued Feb. 26, 1980.

The present invention comprises an apparatus for printing a border on a photographic print comprising a panel with a flat surface having a paper stop at one edge, a frame, hinged to the panel at one edge, having two parallel arms perpendicular to the paper stop, two sliding cross bars extending between the two parallel arms, the cross bars adapted to be maintained parallel with the paper stop at any position in the frame, each cross bar having a straight edge strip at one side to press the photographic print against the flat surface of the panel, and an expandible lightproof concertina-type cover extending between the two sliding cross bars in the frame, the cover having lightproof edge connections with the two parallel arms when the cross bars are at any position in the frame.

In other embodiments the apparatus has a plurality of scales extending from the paper stop for measuring border widths for different standard sizes of photographic print paper. In yet another embodiment the apparatus allows opposite sides of a border on a photographic print to be exposed at the same time and includes a plurality of scales extending from the paper stop for measuring border widths for different standard sizes of photographic print paper, the scales enabling measurement of border widths for both sides of the border to be made on a standard size of paper. In yet a further embodiment, the two sliding cross bars have a string system to ensure that they remain parallel with the paper stop at any position in the frame.

In a preferred embodiment the panel of the apparatus is made of a flat sheet metal, with a nonreflective surface, an angled lip at one edge represents the paper stop, and the frame is in the form of a U with the two sides of the U being the two parallel arms. In yet a further embodiment the frame is removable from the panel for mounting on a different base.

In drawings which illustrate embodiments of the invention,

FIG. 3 is a cross sectional view taken at line 3—3 of FIG. 2.

FIG. 4 is a cross sectional view taken at line 4—4 of FIG. 2.

Figure 1:
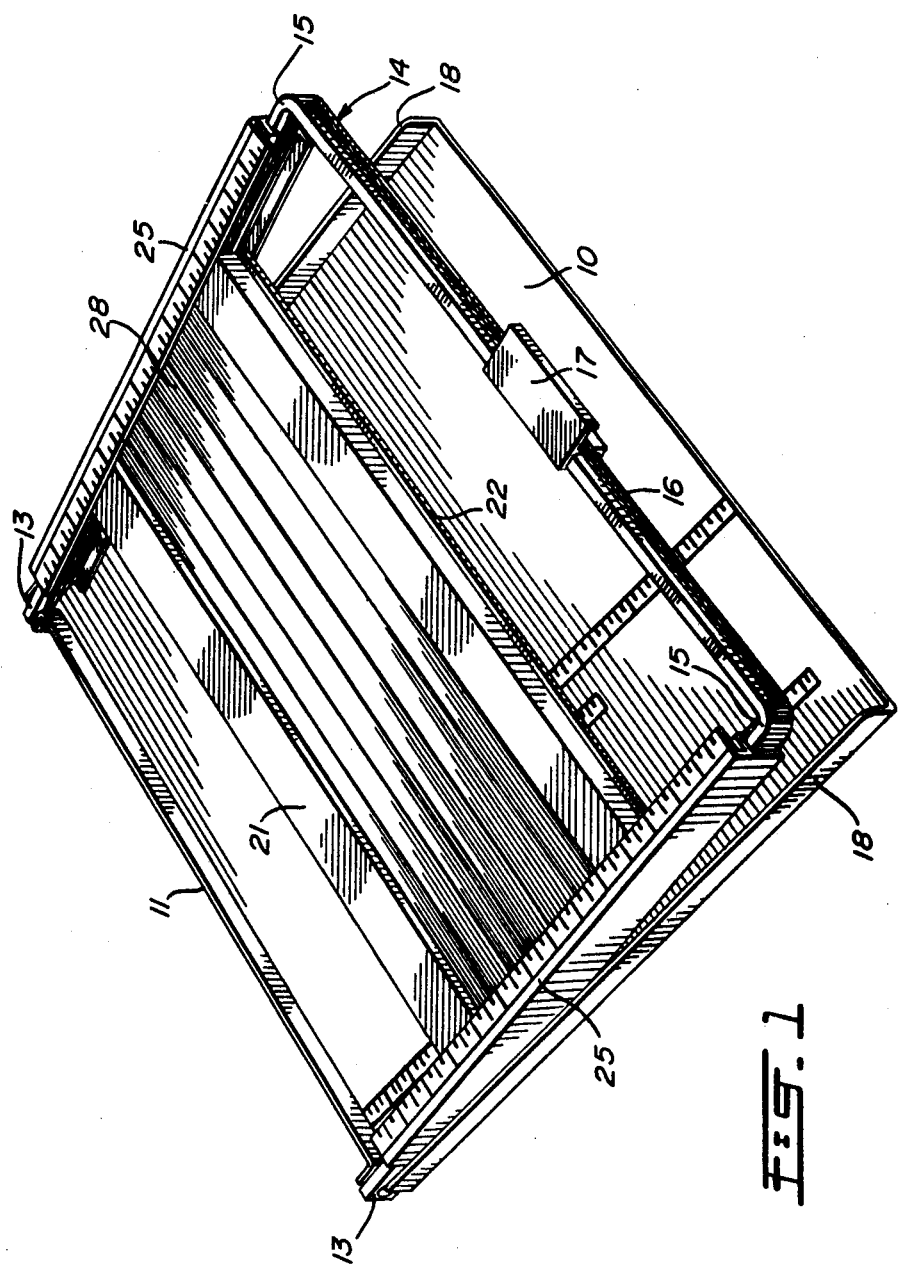
FIG. 1 is an isometric view showing one embodiment of the apparatus according to the present invention.

Referring now to the drawings, the border printer has a base panel 10 formed of sheet metal with a flat surface representing the surface that a sheet of photographic print paper rests on. The flat surface of the panel 10 is preferably a mat black to ensure that no light reflection occurs from the surface.

An angled lip 11 at the top of the panel represents a paper stop. At each side of the paper stop are two tabs 12 formed by bending a strip of the sheet material from the curved lip 11 outwards. The tabs 12 have hinge bolts 13 passing therethrough forming a hinge with a U-shaped frame 14 having two parallel arms 15 and an end member 16 joining the two arms 15 at their ends away from the hinges 13. A handle section 17 formed of an extruded plastic material is positioned in the centre of the end member 16 for ease in lifting the frame 14. The panel 10 has two side flanges 18 to stiffen the flat surface. These also enclose the frame 14 when it is in the lowered position.

Each of the parallel arms 15 of the frame 14 has an extruded plastic section 20 attached thereto having a scale on the top surface measuring from the paper stop 11 on the panel. A first sliding cross bar 21 extends between the two parallel arms 15, retained in a channel of the plastic section 20, and is arranged to be parallel to the paper stop 11. The first cross bar 21 is nearer to the paper stop 11 and a second sliding cross bar 22 is provided further away from the paper stop 11 also retained by the plastic section 20 and parallel to the paper stop 11. Both cross bars 21 and 22 are formed of an extruded plastic section, the first cross bar 21 has a lip 23 facing towards the paper stop 11 which rests on the surface of the panel 10 and has a straight edge so that a sheet of photographic paper held between the cross bar 21 and the panel 10 has a sharp line defining the border printed thereon. The second cross bar 22 has a lip 23 facing away from the paper stop 11 so that a sheet of paper on the panel 10 is designed to have the sides of the border opposite each other exposed and held in place by the two cross bars 21 and 22.

Figure 2:
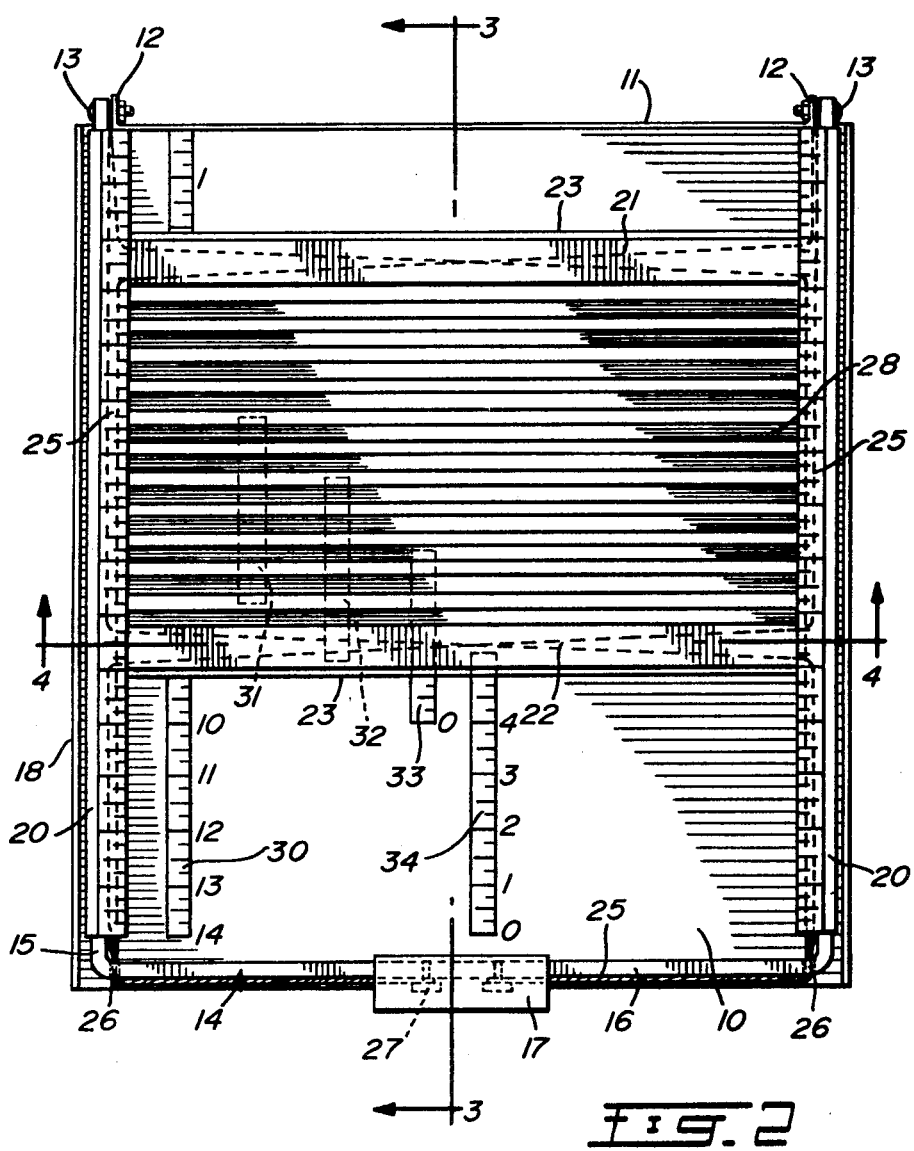
FIG. 2 is a plan view of the apparatus shown in FIG. 1.

As illustrated in FIG. 2, wires or string 25 shown in chain-dotted lines, passes from each hinge 13, along the plastic section 20 on each parellel arm 15 up to the first cross bar 21, through a groove in the cross bar and then away from the hinge 13 along the other plastic section 20, through a hole 26 in the end member 16 of the frame 14 and along to a holding screw 27 beneath the handle 17. A second string extends in the opposite path from the other hinge 13. There are two further strings that each extend back from the screw 27 under the handle 17 through hole 26 in the end member 16 and then along the plastic section 20, across the second cross bar 23 and along the plastic section 20 on the other arm 15 to the hinge 13 on the right hand side of the panel. On the other side there is a similar string extending in the opposite path. Both sets of strings are taut and in this manner both cross bars 21 and 22 remain at all times parallel to the paper stop 11 when they slide backwards and forwards within the parellel arms 15. A concertina or bellows-like diaphragm cover 28 is attached to the adjacent sides of the cross bars 21 and 22 so that no light can pass between the cover 28 and the cross bars 21, 22. The concertina-type cover extends at its edges into grooves into the plastic sections 20 on the arms 15 so that no light can pass through the end of the concertina cover 28 and onto the panel 10 beneath. The concertina cover 28 allows considerable movement of the two cross bars 21, 22 at all times ensuring that no light can pass to paper underneath the cross bars 21, 22.

The panel shown in FIG. 2 is designed for printing standard size paper sheets up to 14 inches in one dimension and down to 8 inches in another dimension. Different sizes of printer may be made for different dimensions of paper sheets. Metric scales may be provided rather than inch scales. Five scales are shown, the first scale 30 commencing at the paper stop 11 reads from 0–14 inches. The second scale 31 (shown in dotted lines) is for 8 inch paper and commences at 0 at a distance of eight inches from the paper stop 11. The next scale 32 (also shown in dotted lines) is for 10 inch paper and commences at 0 at a distance of ten inches from the paper stop 11. The next scale 33 is for 11 inch paper and commences at 0 at a distance of eleven inches from the paper stop 11. The last scale 34 is for 14 inch paper and commences at 0 at a distance of fourteen inches from the paper stop. Thus, standard sizes of paper sheets can be used in the border printer by merely measuring from opposite directions on the appropriate scale to select the width of the border.

In operation, the frame 14 is opened by means of the handle 17. A sheet of photographic paper on which the photographic image has already been exposed is placed on the panel 10 against the paper stop 11 with the immulsion surface facing upwards. The top cross bar 21 and the bottom cross bar 22 are positioned so that the width of the border is correct for opposite sides of the sheet. The frame 14 is lowered onto the panel so that the cross bars 21 and 22 press against the paper sheet. The border printer, with the paper in place, is then exposed to light for a desired period of time. The paper sheet is then removed, turned through 90 degrees and placed with another edge against the paper stop 11 on the panel 10, the cross bars 21 and 22 are then positioned for border widths on opposite sides of the sheet, and these other two sides of the border are then printed. From this border printing step, the paper sheet goes into the developing solution.

In one embodiment of this invention, the two hinge screws 13 are removed and the frame 14 may be removed from the panel 10 and mounted directly on a base plate of an easel of the design shown in my U.S. Pat. No. 4,190,357. In this way, once the photographic image has been projected onto the paper then it is merely necessary to take off the masking blades of the easel and clip or lock the frame 14 onto the carriage of the easel assembly. The base plate of the easel performs the same function as the panel 10 illustrated in this embodiment. In one embodiment the border printer may be constructed as being part of the easel assembly of the type shown in my U.S. patent. The cross bars 21 and 22 together with the concertina cover 28 may be arranged to slide to one end of the printer carriage during the printing of the photographic image, and then moved to the correct position for printing the border without even moving the paper. Scales may be included on the base plate for measuring the widths of borders.

In other embodiments, a light source may be supported on a goose neck or other support above the panel 10 together with a timing device or switch attached to the light source for printing a border. Special masks may be used with the border printer to make a special border as illustrated in my U.S. Pat. No. 4,154,526.

Various changes may be made to the specific design illustrated without departing from the scope of the present invention which is limited only by the following claims.

The embodiments of the invention in which an exclusive property or privilege is claimed are defined as follows:

1. An apparatus for printing a border on a photographic print comprising,
   a panel with a flat surface having a paper stop at one edge,
   a frame, hinged to the panel at the one edge, having two parallel arms perpendicular to the paper stop,
   two sliding cross bars extending between the two parallel arms, the cross bars adapted to be maintained parallel with the paper stop at any position in the frame, each cross bar having a straight edge strip at one side to press the photographic print against the flat surface of the panel, and
   an expandable lightproof concertina-type cover extending between the two sliding cross bars in the frame, the cover having lightproof edge connections with the two parallel arms when the cross bars are at any position in the frame.

2. The apparatus according to claim 1 including a plurality of scales extending from the paper stop for measuring border widths for different standard sizes of photographic print paper.

3. The apparatus according to claim 1 wherein opposite sides of a border on a photographic print may be exposed at the same time, and including a plurality of scales extending from the paper stop for measuring border widths for different standard sizes of photographic print paper, the scales enabling measurement of border widths for both sides of the border to be made on a standard size of paper.

4. The apparatus according to claim 1 wherein the two sliding cross bars have a string system to ensure they remain parallel with the paper stop at any position in the frame.

5. The apparatus according to claim 1 wherein the panel is made of flat sheet metal with a nonreflective surface, an angled lip at one edge represents the paper stop, and the frame is in the form of a U with two sides of the U being the two parallel arms.

6. The apparatus according to claim 1 wherein the frame is removable from the panel for mounting on a different base.

* * * * *